United States Patent [19]
Takahashi

[11] Patent Number: 4,693,461
[45] Date of Patent: Sep. 15, 1987

[54] PAPER SPEED CONTROL IN AUTOMATIC DOCUMENT FEEDER

[75] Inventor: Kozo Takahashi, Nara, Japan

[73] Assignee: Sharp Kabushiki Kaisha, Osaka, Japan

[21] Appl. No.: 822,213

[22] Filed: Jan. 24, 1986

[30] Foreign Application Priority Data

Jan. 30, 1985 [JP] Japan .................................. 60-17975

[51] Int. Cl.⁴ ........................................... B65H 29/68
[52] U.S. Cl. .................................... 271/176; 271/182; 271/202
[58] Field of Search ....................... 271/3, 4, 176, 182, 271/202

[56] References Cited

U.S. PATENT DOCUMENTS

| 3,302,948 | 2/1967 | May | 271/176 |
| 3,315,956 | 4/1967 | Lyman | 271/202 X |
| 3,727,911 | 4/1973 | Vits | 271/202 X |
| 3,752,043 | 8/1973 | Rapparlie | 271/202 X |
| 4,569,514 | 2/1986 | Holtj | 271/182 X |
| 4,580,774 | 4/1986 | Yamaguchi | 271/176 |

Primary Examiner—Richard A. Schacher
Attorney, Agent, or Firm—Birch, Stewart, Kolasch & Birch

[57] ABSTRACT

An automatic document feeder for an electrophotographic copying machine including an automatic document feed device for automatically transporting a plurality of copy documents from a document supply tray to a document discharge tray, at least one pair of document discharge rollers for discharging the plurality of copy documents, a document sensor member for sensing the passage of at least one of the copy documents, the sensing member being disposed just before the pair of document discharge rollers, and a speed reduction device for causing the document discharge rollers to rotate slowly in response to the condition whereby the sensing member detects the rear edge of one of the copy documents under transport.

4 Claims, 5 Drawing Figures

PAPER SPEED CONTROL IN AUTOMATIC DOCUMENT FEEDER

BACKGROUND OF THE INVENTION

The present invention relates to an automatic document feeder for an electrophotographic copying machine and, more particularly, to a paper speed control device of an automatic document feeder for controlling the discharge speed of a document from an electrophotographic copying machine.

An electrophotographic copying machine produces an electrostatic latent image onto a photoreceptor corresponding to a pattern image of a document such as a book to be copied. Toner particles are electrostatically attracted to the latent image, so that the latent image becomes visible as a toner image. The toner image on the photoreceptor is transferred onto a copy paper via a transference charger. An automatic document feeder may be, if desired, coupled to the copying machine for automatically and sequentially feeding a plurality of documents to a light scanning table to subsequently copy the documents. The plurality of documents to be copied are piled initially on a document tray. The copied documents are subsequently discharged from the automatic document feeder to a discharge tray.

When the plurality of copy documents are discharged, conventionally, they may be scattered and in disarray because of high speed document transport from the document feeder.

This tends to crumple and wrinkle the documents. It is therefore desired to provide an improved document feeder for discharging the copy documents at low speed.

SUMMARY OF THE INVENTION

Accordingly, it is an object of the present invention to provide an improved automatic document feeder for an electrophotographic copying machine for controlling the discharging speed of a plurality of copy documents to a discharge tray.

It is another object of the present invention to provide an improved automatic document feeder for an electrophotographic copying machine for slowly discharging a plurality of copy documents to a document tray, the documents being originally transported by way of the document feeder at a high speed.

Briefly described, in accordance with the present invention, an automatic document feeder for an electrophotographic copying machine comprises an automatic document feed device for automatically transporting a plurality of copy documents from a document supply tray to a document discharge tray, at least one pair of document discharge rollers for discharging the plurality of copy documents, document sensing means for sensing the passage of at least one of the copy documents, the sensing means being disposed just before the pair of document discharge rollers, and speed reduction means for causing the document discharge rollers to slowly rotate in response to the condition whereby the sensing means detects the rear end of one of the copy documents under transport.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

Figure 2:
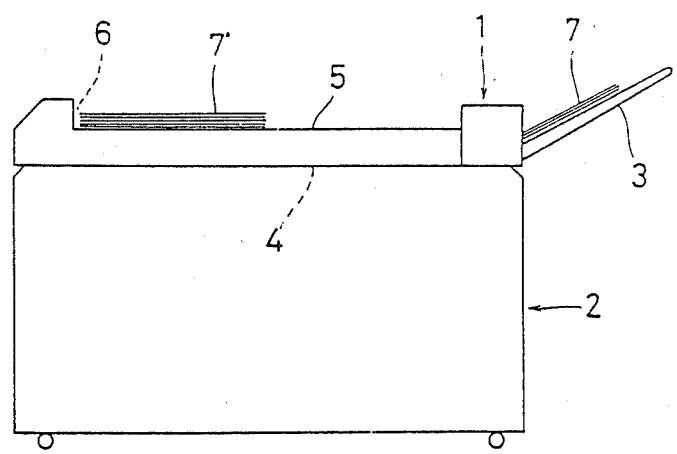
FIG. 2 is a side view of the copying machine equipped with the automatic document feeder of FIG. 1.

Referring to FIG. 2, the automatic document feeder 1 of the present invention is attached on a document table 4 of the electrophotographic copying machine 2. A document tray 3 is provided on the right side of the copying machine 2. On the document tray 3 a plurality of copy documents 7 are piled. When the automatic copy operation of the copying machine 2 is started, the plurality of documents are subsequently transported to the document table 4 for light scanning. After light scanning, the copy documents 7 are discharged and piled on a document discharge tray 5 represented as documents 7' through a discharge outlet 6. The document discharge tray 5 is provided on the outer side of the automatic document feeder 1.

Figure 1:
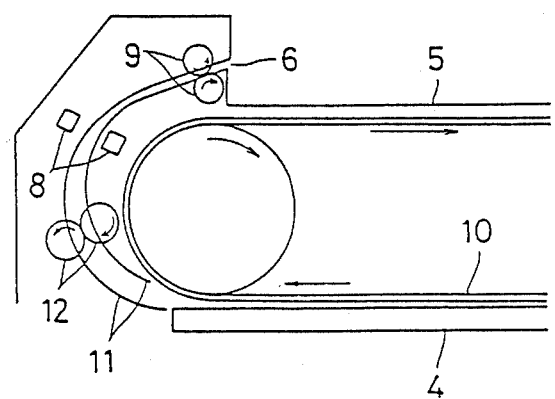
FIG. 1 is a side sectional view of an automatic document feeder for an electrophotographic copying machine according to the present invention.

Referring to FIG. 1, the automatic document feeder 1 includes a document transport belt 10 which traverses the document table 4 of the copying machine 2. That belt forms a document transport path on the document table 4 by which the copy documents are transported from the document tray 3 to the document discharge portion. A document guide 11 is disposed at the document discharge portion where the copy documents are ejected by the document transport belt 10. The guide 11 receives the documents ejected from the document transport belt 10 and reverses them while it transports them to the discharge outlet 6. On the document guide 11, there are provided at least one pair of transport rollers 12, at least one pair of photosensors 8, and at least one pair of document discharge rollers 9. The pair of photosensors 8 have an optical axis traversing the transport path of the documents. When the documents cross the optical axis of the pair of photosensors 8, the light path is obstructed to thereby switch OFF. Otherwise, the switch of the photosensors 8 is switched ON because the light from the light emitting device of the photosensors 8 can be incident on the light receiving device. The transport belt 10 is controlled to be driven or stopped in response to the instructions from a control means of the automatic document feeder 1. When the automatic document feeder 1 is powered ON, the transport rollers 12 are rotated at a constant speed. The document discharge rollers 9 are controlled to be rotated at high speed (identical with the speed of the document transport rollers 12) or at a low speed by the control means.

Figure 3:
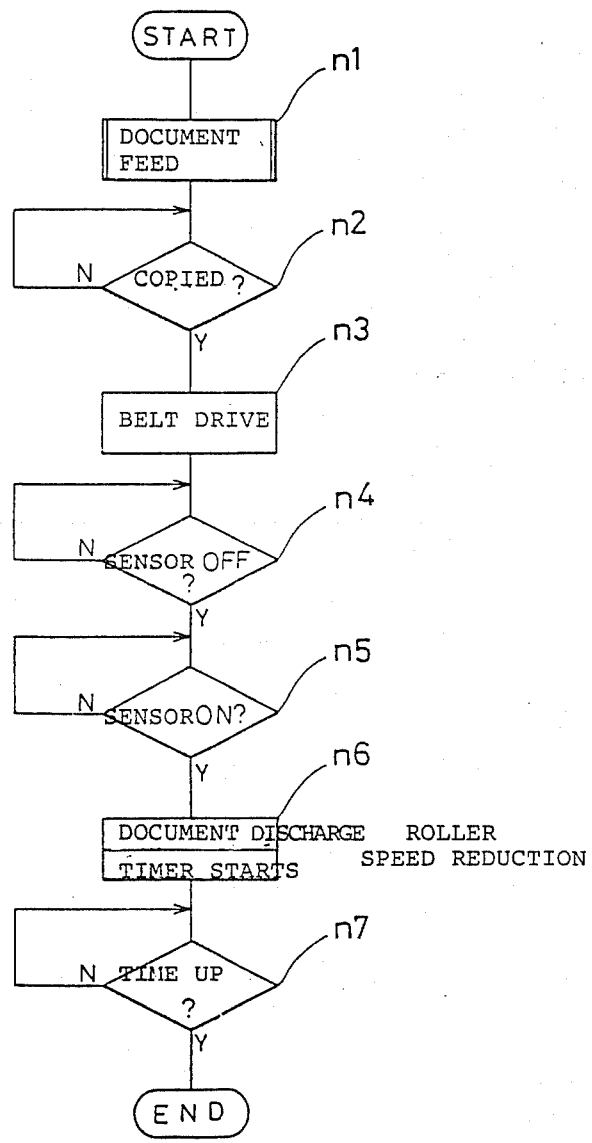
FIG. 3 is a flow chart of the operation of the control means of the automatic document feeder.

FIG. 3 is a flow chart of the operation of the control means of the automatic document feeder 1 which reflects the sequence of operation of the present invention.

Figure 4:
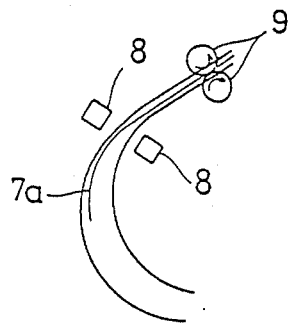
FIGS. 4 (A) and 4(B) are views showing the conditions when a copy document is being transported through the discharge portion of the automatic document feeder, and when the copy document is being discharged through the discharge outlet, respectively.
Figure 4:
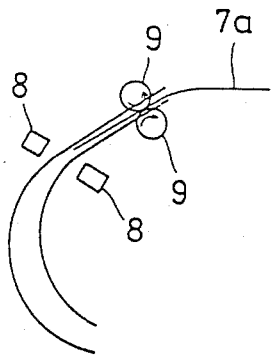

Referring to FIG. 3, after the automatic document feeder 1 is started, the following steps are selected:

Step n1: A single document 7a (FIGS. 4A and 4B) is removed from the plurality of copy documents 7 piled on the document tray 3, so as to be transported toward the document table 4.

Step n2: The operation of the automatic document feeder 1 is stopped until the copy completion signal is generated from the copying machine.

Step n3: In accordance with the input of the copy completion signal, the transport belt 10 is started again so as to discharge the document 7a.

Step n4: Detects whether the document 7a is transported toward the document outlet 6, passing across the optical axis of the photosensors 8 obstructing the light path to thereby switch the switch OFF as viewed in FIG. 4(A). The speed reduction does not proceed until this detection.

Step n5: The transportation of the document is monitored until the photosensors 8 are switched ON again as viewed in FIG. 4(B). As a result of the operations of steps n4 and n5, it can be detected when the rear or trailing edge of the document 7a has passed the photosensors 8.

Step n6: Following the operation of step n5, the rotation speed of the document discharge rollers 6 is reduced by the document speed-reduction means of the document feeder control means and a timer means is started. The time set in the timer means is selected so that the rear edge of the document 7a can be well past the document discharge rollers 9 before the timer expires and the speed of the discharge rollers is once again set at the high speed of the document transport rollers and document transport means.

Step n7: The passage of the time of the timer means is detected. The operations of steps n6 and n7 are conducted in conjunction with the document-speed reduction means of the present invention.

The flow chart of FIG. 3 relates to a case where a single copy document is to be copied. In the case where a plurality of copy documents are to be automatically and sequentially fed by the automatic document feeder 1, the operations of FIG. 3 may overlap.

The automatic document feeder 1 is therefore provided with the document speed-reduction means of the present invention. Only when and after the rear or trailing edge of the document 7a passing through the document transport path within the automatic document feeder 1 at high speed, has just passed between the photosensors 8, positioned just before the document discharge rollers 9, can the document discharge rollers 9 be rotated slowly. The transport speed of the document 7a is thereby reduced. The document can be slowly discharged and lands softly on the document discharge tray 5. Thus, the plurality of documents 7' can be slowly and softly discharged to be aligned on the document discharge tray 5. They will not be scattered on the tray 5 or jammed near the document discharge outlet 6 so as not to crumple and damage the documents 7'.

While only certain embodiments of the present invention have been described, it will be apparent to those skilled in the art that various changes and modifications may be made therein without departing from the spirit and scope of the present invention as claimed.

What is claimed is:

1. An automatic document feeder suitable for an electrophotographic copying machine comprising:
    document table means for the placement of documents thereon;
    document receiving means for receiving said documents for copying;
    document discharge portion of said document feeder, provided adjacent said document receiving means, for discharging said document, said discharge portion comprising a document guide, transport means, sensor means and document discharge means, said sensor means, for detecting the transport of said documents, being positioned between said transport means and document discharge means;
    document transport means for automatically transporting said documents from said document table means to said document receiving means to said document discharge portion; and
    speed reduction means responsive to a condition whereby said sensor means detects the passing of a trailing edge of said transported document, to thereby reduce the speed of said document discharge means.

2. The document feeder of claim 1, wherein said document discharge means comprises at least one pair of rollers.

3. The document feeder of claim 1, wherein said sensor means comprises at least one pair of photosensors.

4. The feeder of claim 1, further comprising timer means for counting a predetermined time after which the rear or trailing edge of the copy document has passed said document discharge means, said timer means being activated in response to said condition whereby said rear edge of said copy document has just passed said sensor means.

* * * * *